(12) United States Patent
Mitchell et al.

(10) Patent No.: US 9,137,588 B2
(45) Date of Patent: Sep. 15, 2015

(54) TEST CONNECTOR APPARATUS FOR LOOK-BOTH-WAYS TESTING

(75) Inventors: Mathew Bryce Mitchell, Lilydale (AU); Lionel Connell, Eltham (AU)

(73) Assignee: AEGIS PTY. LTD., Vermont (AU)

( * ) Notice: Subject to any disclaimer, the term of this patent is extended or adjusted under 35 U.S.C. 154(b) by 878 days.

(21) Appl. No.: 13/391,560

(22) PCT Filed: Jul. 15, 2010

(86) PCT No.: PCT/AU2010/000900
§ 371 (c)(1),
(2), (4) Date: Feb. 21, 2012

(87) PCT Pub. No.: WO2011/020139
PCT Pub. Date: Feb. 24, 2011

(65) Prior Publication Data
US 2012/0146654 A1   Jun. 14, 2012

(30) Foreign Application Priority Data
Aug. 20, 2009   (AU) .............................. 2009903923

(51) Int. Cl.
*H04M 1/24* (2006.01)
*H04M 3/08* (2006.01)
*H04M 3/22* (2006.01)
*H04Q 1/20* (2006.01)

(52) U.S. Cl.
CPC ...................................... *H04Q 1/20* (2013.01)

(58) Field of Classification Search
CPC ....... H01H 3/08; H01H 3/308; H01H 9/0228; H01H 15/06; H01H 19/10; H01R 1/0416; H01R 11/18; H01R 31/02; H01R 35/02; G01R 1/0416; G01R 31/023

USPC ........... 379/1.01, 21, 22.03, 22.06, 22.07, 23, 379/24, 27.01, 27.07, 30, 32.04; 324/66, 324/508, 512, 522, 523, 525, 526, 539, 324/750.01, 750.02; 439/866, 867, 844, 439/891

See application file for complete search history.

(56) References Cited

U.S. PATENT DOCUMENTS

| | | | |
|---|---|---|---|
| 4,708,667 A * | 11/1987 | Lindquist et al. | 439/788 |
| 4,839,599 A * | 6/1989 | Fischer | 324/542 |
| 6,429,663 B1 | 8/2002 | LaCoste | |
| 7,200,205 B1 | 4/2007 | Matuszewski et al. | |
| 2004/0109540 A1* | 6/2004 | Forsberg | 379/21 |
| 2010/0074415 A1* | 3/2010 | Knudson et al. | 379/21 |
| 2012/0307981 A1* | 12/2012 | Larkin | 379/27.01 |

FOREIGN PATENT DOCUMENTS

JP   63-078695 A   4/1988

* cited by examiner

*Primary Examiner* — Binh Tieu
(74) *Attorney, Agent, or Firm* — Sughrue Mion, PLLC

(57) ABSTRACT

Test connector apparatus having an elongate tubular body housing a rotary switch, a cord extending from one end of the body to terminate with an adapter head, a rotary knob at the other end of the body to actuate the rotary switch, a plurality of terminals in the rotary knob electrically connected to the adapter head by the rotary switch and the cord, and a plurality of test heads having differently configured test probes electrically connectable to differently configured test access points electrically connected between conductor pairs, wherein the plurality of test heads are interchangeably electrically connectable to the adapter head.

7 Claims, 4 Drawing Sheets

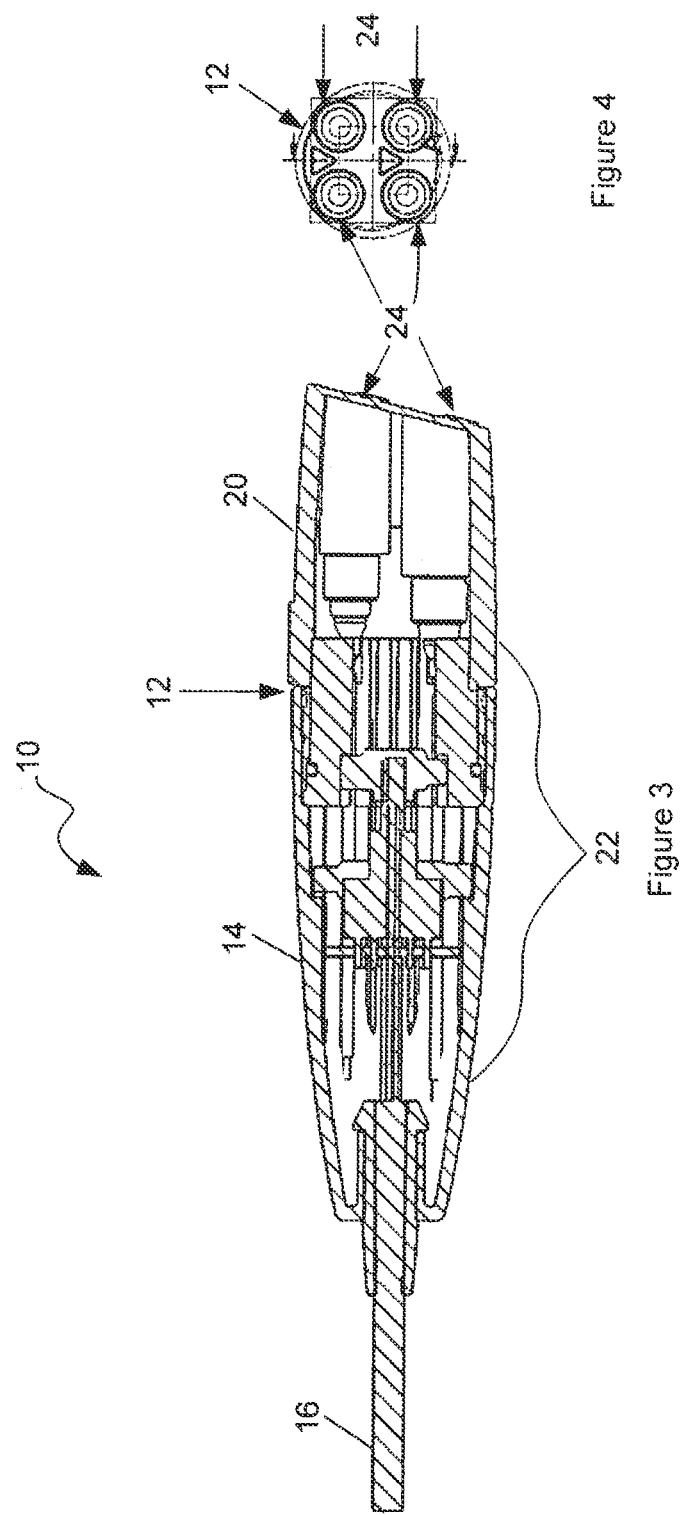

TEST CONNECTOR APPARATUS FOR LOOK-BOTH-WAYS TESTING

CROSS REFERENCE TO RELATED APPLICATION

This application is a National Stage of International Application No. PCT/AU2010/000900, filed on Jul. 15, 2010, claiming priority based on Australian Patent Application No. 2009903923, filed Aug. 20, 2009, the contents of all of which are incorporated herein by reference in their entirety.

FIELD OF THE INVENTION

The present invention relates to test connector apparatus for look-both-ways (or test-both-ways) testing of conductor pairs in telecommunications networks.

BACKGROUND OF THE INVENTION

Look-both-ways (or test-both-ways) testing of conductor pairs in a voice/data telecommunications network is conventionally performed using a test cord to interconnect a test device to a test port in a main distribution frame of the network. One end of the test plug has a test plug to plug into the test port, and the other end has electrical connectors to plug into the test device. The lack of standardized test plugs/ports means that technicians are required to carry many different proprietary test cords from site-to-site.

What is needed is test connector apparatus for look-both-ways testing which addresses the above difficulties.

SUMMARY OF THE INVENTION

According to the present invention, there is provided test connector apparatus having an elongate tubular body housing a rotary switch, a cord extending from one end of the body to terminate with an adapter head, a rotary knob at the other end of the body to actuate the rotary switch, a plurality of terminals in the rotary knob electrically connected to the adapter head by the rotary switch and the cord, and a plurality of test heads having differently configured test probes electrically connectable to differently configured test access points electrically connected between conductor pairs, wherein the plurality of test heads are interchangeably electrically connectable to the adapter head.

The rotary switch can be a three-position selector switch which is actuatable to allow the test probes to selectively perform look-both-ways testing of the conductor pairs using a test device electrically connected to the plurality of terminals in the rotary knob.

The rotary knob can concentrically abut the body, and together the body and the rotary knob can be sized and shaped to be handheld.

The test probes can be test plugs, and the test access points can be test ports in main distribution frames.

The plurality of terminals in the rotary knob can be a plurality of banana sockets.

The adapter head and the plurality of test heads can be interchangeably connectable to one another by mating male and female connectors.

The adapter head can have a female socket, and each test head can have a male plug extending oppositely from the test plug.

BRIEF DESCRIPTION OF THE DRAWINGS

The invention will be further described by way of example only with reference to the accompanying drawings, in which:

FIG. 3 is a section through the apparatus, excluding its adapter head and interchangeable test heads;

FIG. 4 is an end view of the rotary knob of the apparatus; and

DETAILED DESCRIPTION

Figure 1:
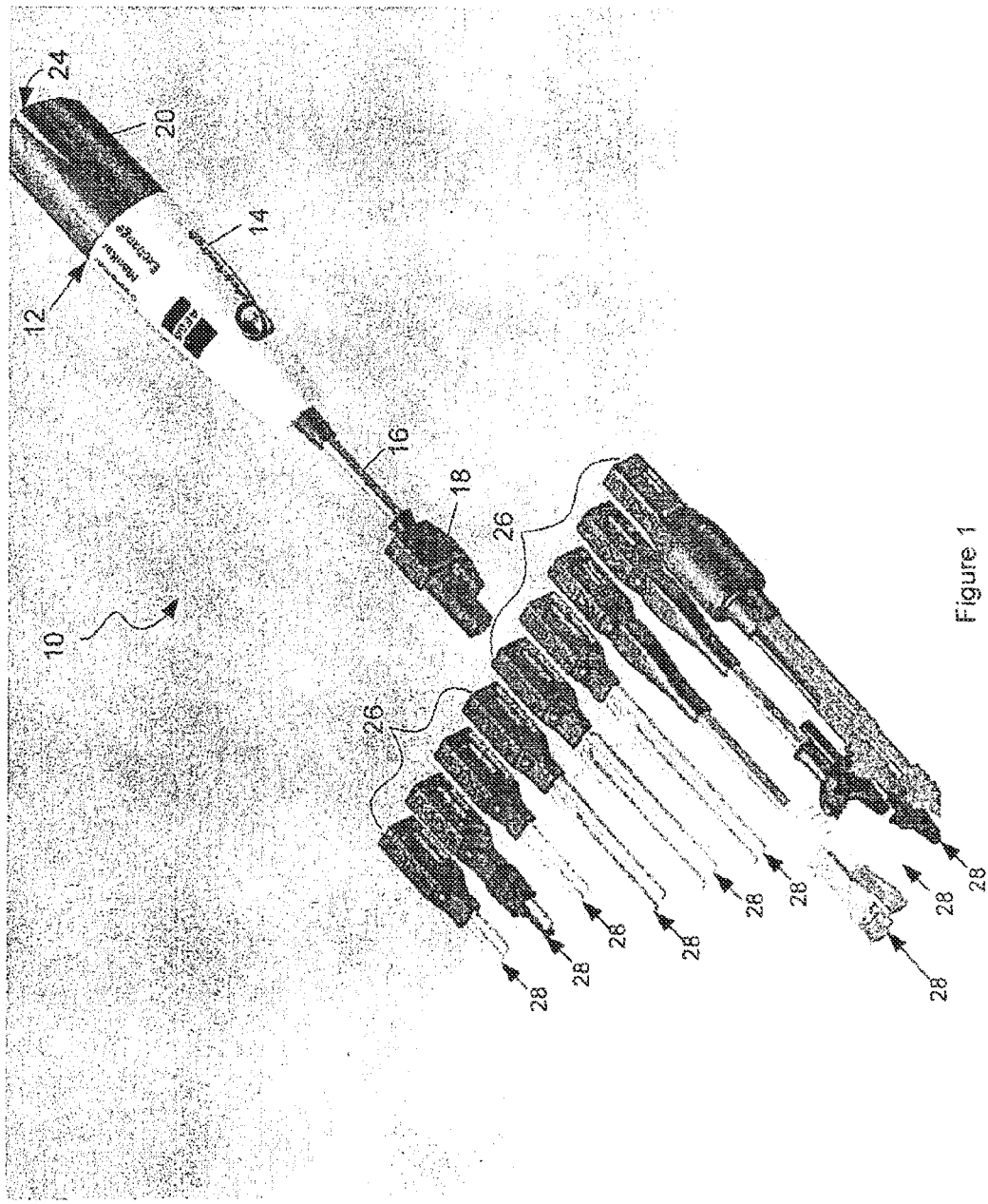
FIG. 1 is a perspective view of an embodiment of test connector apparatus of the invention.

FIG. 1 illustrates an embodiment of test connector apparatus 10 of the invention. The apparatus 10 includes a handpiece 12 having an elongate tubular body 14 with a cord 16 extending from one end of the body 12 to terminate with an adapter socket 18. A rotary knob 20 concentrically abuts the other end of the body 14. The body 14 and the rotary knob 20 are formed, for example, as moldings in electrically insulative plastics.

Figure 2:
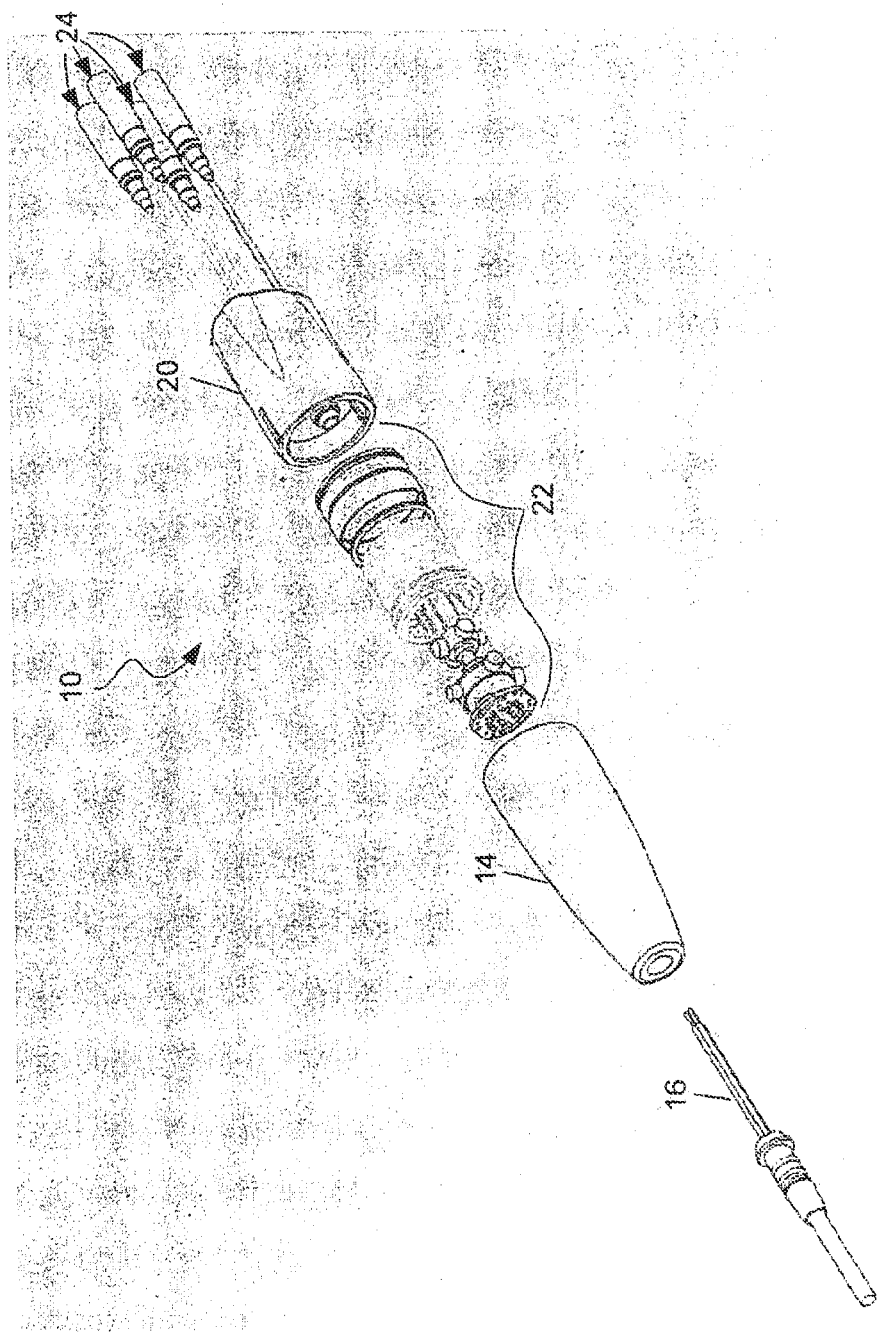
FIG. 2 is an exploded perspective view of the apparatus, excluding its adapter head and interchangeable test heads.

Referring to FIGS. 2 and 3, the body 14 houses a rotary switch 22 which is actuatable by the rotary knob 20. Referring to FIGS. 2 and 4, a plurality of terminals 24 are provided in the rotary knob 20. The terminals 24 are, for example banana sockets, for receiving banana plug leads electrically connected to a test device, for example, a test telephone, an oscilloscope, a meter, etc. Other equivalent electrical terminals and test devices may also be used.

Referring again to FIGS. 2 and 3, the terminals 24 are electrically connected to the adapter head 18 by the rotary switch 20 and the cord 16. Referring again to FIG. 1, the apparatus 10 further includes a plurality of test heads 26 having differently configured test probes 28 that electrically connectable to differently configured test access points (not shown) electrically connected between conductor pairs (not shown). The set of differently configured test probes 28 are, for example, different proprietary test plugs that are electrically connectable to differently configured test access points (not shown) between conductor pairs (not shown) of voice/data telecommunications networks (not shown). The differently configured test access points are, for example, different proprietary test ports in different proprietary disconnection modules of the networks.

Figure 5:
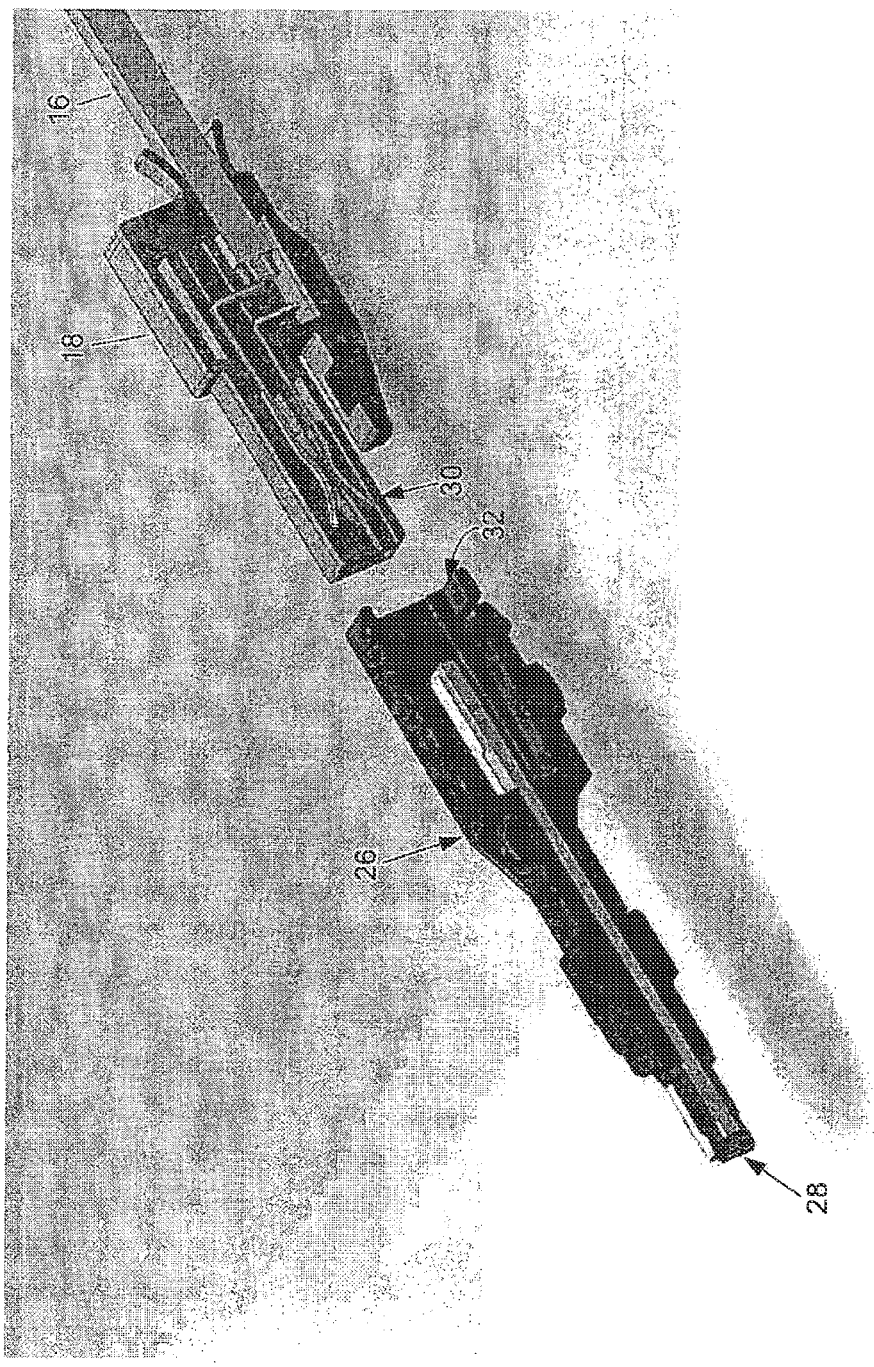
FIG. 5 is a perspective section through the adapter head and a test head.

The test heads 26 are interchangeably electrically connectable to the adapter head 18. For example, the adapter head 18 and any of the test heads 26 are interchangeably connectable to one another by mating male and female connectors. Referring to FIG. 5, the adapter head 18 is, for example, configured as a plug or jack 30, and each test head 26 has, for example, a mating socket or port 32 extending oppositely from the test plug 28. Other equivalent mating connectors may also be used.

Referring again to FIG. 1, the rotary switch 20 is a three-position selector switch having the positions "Customer", "Monitor", and "Exchange" which is actuatable to allow the test probes 28 to selectively perform conventional look-both-ways testing of the conductor pairs using a test device electrically connected to the terminals 24 in the rotary knob 20.

It will be appreciated that embodiments of the invention provide test connection apparatus that enable safe, selective modular electrical connections between test access points and test equipment to perform look-both ways testing of conductor points. The interchangeability of the test heads 26 avoids the need for technicians to carry many different proprietary test cords from site-to-site when testing different proprietary network access points. It will be appreciated that the test heads 26 are advantageously more compact, and hence more easily carried by technicians, compared to conventional proprietary test cords.

The embodiments have been described by way of example only and modifications are possible within the scope of the claims which follow.

The invention claimed is:

1. A test connector apparatus comprising an elongate tubular body housing a rotary switch, a cord extending from one end of the body to terminate with an adapter head, a rotary knob at the other end of the body to actuate the rotary switch, a plurality of terminals in the rotary knob electrically connected to the adapter head by the rotary switch and the cord, and a plurality of test heads having differently configured test probes electrically connectable to differently configured test access points electrically connected between conductor pairs, wherein the plurality of test heads are interchangeably electrically connectable to the adapter head.

2. The test connector apparatus according to claim 1, wherein the rotary switch is a three-position selector switch which is actuatable to allow the test probes to selectively perform look-both-ways testing of the conductor pairs using a test device electrically connected to the plurality of terminals in the rotary knob.

3. The test connector apparatus according to claim 1, wherein the rotary knob concentrically abuts the body, and together the body and the rotary knob are sized and shaped to be handheld.

4. The test connector apparatus according to claim 1, wherein the test probes are test plugs, and the test access points are test ports in disconnection modules.

5. The test connector apparatus according to claim 1, wherein the plurality of terminals in the rotary knob are a plurality of banana sockets.

6. The test connector apparatus according to claim 1, wherein the adapter head and the plurality of test heads are interchangeably connectable to one another by mating male and female connectors.

7. The test connect apparatus according to claim 4, wherein the adapter head has a female socket, and each test head has a male plug extending oppositely from the test plug.

* * * * *